(12) United States Patent
Lee

(10) Patent No.: US 10,934,909 B2
(45) Date of Patent: Mar. 2, 2021

(54) APPARATUS AND METHOD FOR CONTROLLING EXHAUST GAS PURIFICATION

(71) Applicants: HYUNDAI MOTOR COMPANY, Seoul (KR); KIA MOTORS CORPORATION, Seoul (KR)

(72) Inventor: Jun-Yong Lee, Seongnam-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/673,188

(22) Filed: Nov. 4, 2019

(65) Prior Publication Data

US 2020/0191034 A1 Jun. 18, 2020

(30) Foreign Application Priority Data

Dec. 13, 2018 (KR) .................. 10-2018-0160832

(51) Int. Cl.
| | |
|---|---|
| *F01N 3/031* | (2006.01) |
| *F01N 3/20* | (2006.01) |
| *F01N 3/035* | (2006.01) |
| *F01N 3/10* | (2006.01) |
| *F01N 13/00* | (2010.01) |

(52) U.S. Cl.
CPC ............ *F01N 3/031* (2013.01); *F01N 3/035* (2013.01); *F01N 3/2006* (2013.01); *F01N 3/2053* (2013.01); *F01N 3/108* (2013.01); *F01N 3/2066* (2013.01); *F01N 13/0093* (2014.06); *F01N 2340/02* (2013.01); *F01N 2900/1402* (2013.01); *F01N 2900/1404* (2013.01); *F01N 2900/1411* (2013.01); *F01N 2900/1621* (2013.01)

(58) Field of Classification Search
CPC .... F01N 3/031; F01N 3/2053; F01N 13/0093; F01N 13/087; F01N 2410/06
See application file for complete search history.

(56) References Cited

U.S. PATENT DOCUMENTS

2017/0234196 A1* 8/2017 Ulrey .................... F01N 3/0238
60/274
2019/0017423 A1* 1/2019 Martin .................... F01N 9/002

FOREIGN PATENT DOCUMENTS

| KR | 10-2012-0130614 A | 12/2012 |
|---|---|---|
| KR | 10-2018-0028151 A | 3/2018 |

* cited by examiner

*Primary Examiner* — Jonathan R Matthias
(74) *Attorney, Agent, or Firm* — Brinks Gilson & Lione

(57) ABSTRACT

An apparatus for controlling exhaust gas purification may include a front unit communicating with an engine exhaust pipe and having a first catalytic filter; a rear unit communicating with the front unit through a connection pipe and having a second catalytic filter and a bypass channel formed to surround the second catalytic filter; and an actuator to open or close the bypass channel. In particular, one end of the bypass channel is opened or closed and other end thereof is sealed so that the second catalytic filter is heated by a primary filtered exhaust gas filtered by and discharged from the front unit.

13 Claims, 2 Drawing Sheets

APPARATUS AND METHOD FOR CONTROLLING EXHAUST GAS PURIFICATION

CROSS-REFERENCE TO RELATED APPLICATION

This application claims priority to and the benefit of Korean Patent Application No. 10-2018-0160832, filed on Dec. 13, 2018, the entire contents of which are incorporated herein by reference.

FIELD

Exemplary forms of the present disclosure relate to an exhaust gas purification technology; and, particularly, to an apparatus and method for controlling exhaust gas purification.

BACKGROUND

The statements in this section merely provide background information related to the present disclosure and may not constitute prior art.

Diesel vehicles currently available on the market are equipped with a selective catalytic reduction (SCR) system for purification of nitrogen oxides (NOx) to meet emission regulations.

A method of using the combination of SDPF (a selective catalytic reduction on diesel particulate filter) and SCR with double-dosing has been considered as one of the most desired forms in order to meet EURO 7 regulations that will be applied in the future.

However, in such a method, a dosing injector is placed in the front of an SCR on diesel particulate filter (SDPF) and an SCR system for injection of urea ($NH_3$ aqueous solution). In addition, a mixer is mounted on a catalyst to increase a degree of distribution (uniformity) of $NH_3$.

The performance of the mixer is generally inversely proportional to the differential pressure, and a relatively high differential pressure is sacrificed to increase the uniformity.

In addition, the performance of the catalyst itself is generally inversely proportional to the differential pressure, and the catalyst generally has a high differential pressure to improve the purification performance.

We have discovered that since the back pressure in the engine as a whole is increased due to an increase in differential pressure by the application of the mixer and the catalyst, scavenging efficiency is deteriorated, and the engine fuel efficiency and/or performance decreases.

SUMMARY

The present disclosure is directed to an apparatus and method for controlling exhaust gas purification, capable of reducing or minimizing an increase in back pressure by bypassing a mixer and a catalyst in a selective catalytic reduction (SCR) as desired.

Another form of the present disclosure is directed to an apparatus and method for controlling exhaust gas purification, capable of reducing carbon dioxide ($CO_2$) through an improvement in fuel efficiency.

Other objects and advantages of the present disclosure can be understood by the following description, and become apparent with reference to the forms of the present disclosure. Also, it is obvious to those skilled in the art to which the present disclosure pertains that the objects and advantages of the present disclosure can be realized by the means as claimed and combinations thereof.

The present disclosure provides an apparatus for controlling exhaust gas purification capable of reducing or minimizing an increase in back pressure by bypassing a mixer and a catalyst in a selective catalytic reduction (SCR) as desired.

The apparatus includes: a front unit communicating with an engine exhaust pipe and having a first catalytic filter, a rear unit communicating with the front unit through a connection pipe and having a second catalytic filter and a bypass channel formed to surround the second catalytic filter, and an actuator to open and close the bypass channel.

One end of the bypass channel may be opened or closed and other end thereof may be sealed so that the second catalytic filter is heated by a primary filtered exhaust gas filtered by and discharged from the front unit.

The one end of the bypass channel may be at a position spaced apart from an inlet of the rear unit by a certain distance, and the inlet of the rear unit is connected to the connection pipe.

The bypass channel may be opened or closed by a switching valve operated by the actuator.

The bypass channel may be maintained in a closed state at the time of initial start-up.

The apparatus may further include a controller configured to compare temperature information obtained by at least one temperature sensor, exhaust gas information obtained by at least one gas sensor, and vehicle operation information with predetermined conditions and to control the actuator to open or close the bypass channel according to a result of the comparison.

The predetermined conditions may be at least one of a first condition in which an exhaust gas temperature is compared with a predetermined first reference value based on the temperature information, a second condition in which a first discharge amount of gas is compared with a predetermined second reference value, and a third condition in which a second discharge amount of gas calculated by multiplying the first discharge amount of gas by expected purification efficiency is compared with a predetermined third reference value.

The first discharge amount of gas may be calculated by multiplying a vehicle speed and an exhaust flow rate based on the vehicle operation information.

The expected purification efficiency is calculated using a base map based on the exhaust gas temperature and an occlusion amount, a first correction map based on the exhaust gas temperature and an exhaust flow rate, a second correction map based on an exhaust gas concentration and the exhaust gas temperature, and an aging factor that exhibits efficiency according to the degree of deterioration of a catalyst.

The at least one temperature sensor may be installed in each of the connection pipe and the engine exhaust pipe, and the at least one gas sensor may be installed in each of the connection pipe, the engine exhaust pipe, a discharge pipe communicating with the rear unit.

The first catalytic filter may be a selective catalytic reduction on diesel particulate filter (SDPF), and the second catalytic filter may be a selective catalytic reduction (SCR) filter.

In accordance with another form of the present disclosure, there is provided a method of controlling exhaust gas purification in which a front unit communicating with an engine exhaust pipe and having a first catalytic filter communicates with a rear unit through a connection pipe, the rear unit having a second catalytic filter and a bypass channel formed to surround the second catalytic filter, and an actuator is installed in the rear unit to open or close the bypass channel.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
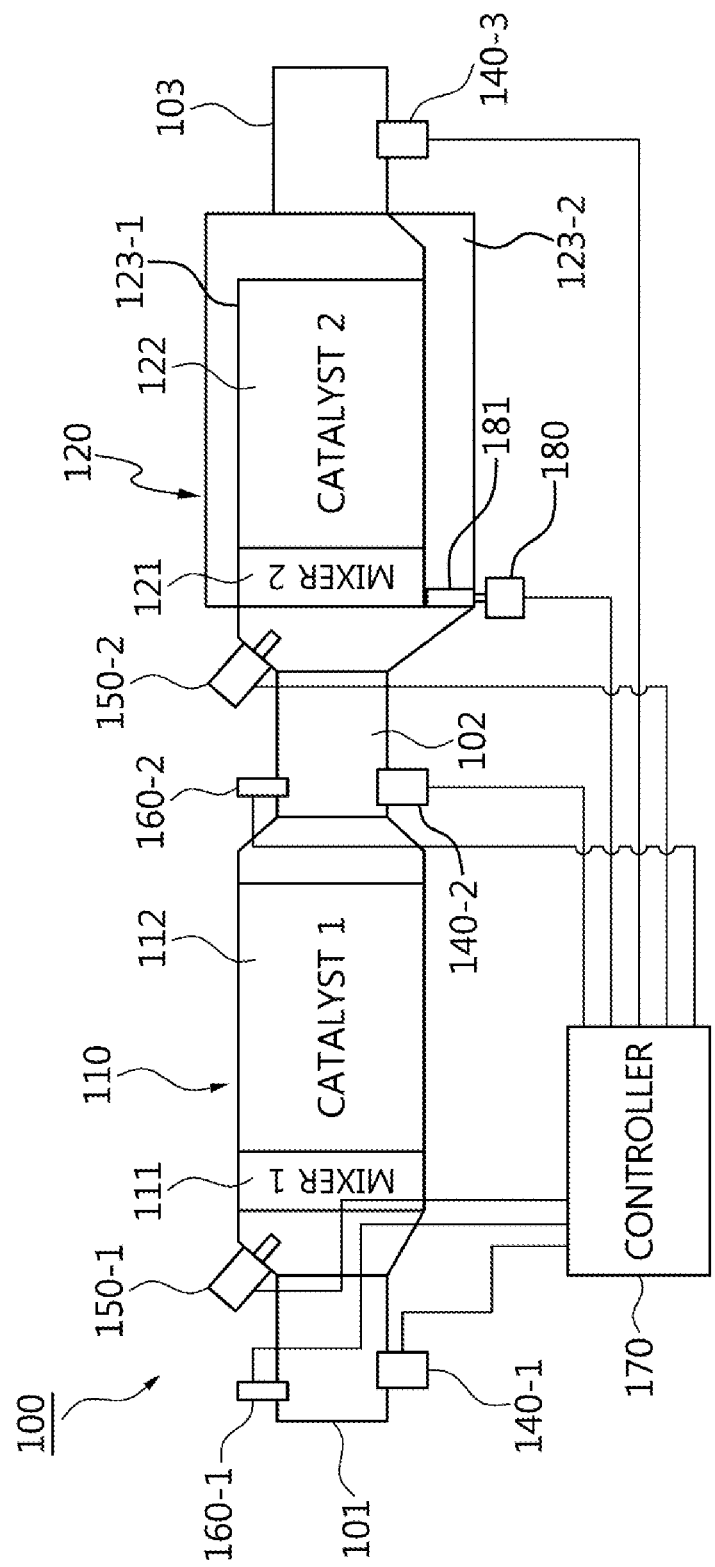
FIG. 1 is a diagram illustrating a configuration of an apparatus for controlling exhaust gas purification according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure may, however, be embodied in different forms and should not be construed as limited to the forms set forth herein. Rather, these forms are provided so that this disclosure will be thorough and complete, and will fully convey the scope of the present disclosure to those skilled in the art. Therefore, it should be understood that the scope and spirit of the present disclosure can be extended to all variations, equivalents, and replacements in addition to the appended drawings of the present disclosure.

Throughout the disclosure, like reference numerals refer to like parts throughout the various figures and forms of the present disclosure. The terms including expressions, such as first and/or second, used in the specification of the present disclosure may be used to describe various elements of the present disclosure. However, the elements of the present disclosure should not be limited by the terms used in the specification of the present disclosure. In other words, such terms will be used only to differentiate one element from other elements of the present disclosure.

For example, without deviating from the scope and spirit of the present disclosure, a first element may be referred to as a second element, and, similarly, a second element may also be referred to as a first element. As used herein, the term "and/or" includes any and all combinations of one or more of the associated listed items.

Unless otherwise defined, all terms, including technical and scientific terms, used herein have the same meaning as commonly understood by one of ordinary skill in the art.

It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, an apparatus and method for controlling exhaust gas purification according to exemplary forms of the present disclosure will be described in detail with reference to the accompanying drawings.

FIG. 1 is a diagram illustrating a configuration of an apparatus for controlling exhaust gas purification 100 according to one form of the present disclosure. Referring to FIG. 1, the apparatus for controlling exhaust gas purification 100 may include a front unit 110 directly connected to an engine exhaust pipe 101, and a rear unit 120 connected to the front unit 110 by a connection pipe 102.

The front unit 110 is a hollow tubular unit having a smaller diameter at both ends thereof than other portions. The front unit 110 may include a first injector 150-1 for injecting urea, a first mixer 111 for mixing the urea injected by the first injector 150-1 with the exhaust gas introduced through the engine exhaust pipe 101, a first catalytic filter 112, and so on. The first catalytic filter 112 is a selective catalytic reduction on diesel particulate filter (SDPF).

One end of the front unit 110 directly communicates with the engine exhaust pipe 101, and the other end of the front unit 110 communicates with the connection pipe 102. The connection pipe 102 is a hollow pipe and serves as a passage in which the exhaust gas discharged from the front unit 110 flows into the rear unit 120.

The engine exhaust pipe 101 is installed with a first temperature sensor 160-1 and a first gas sensor 140-1. The first temperature sensor 160-1 and the first gas sensor 140-1 transmit temperature information and exhaust gas information after detecting exhaust gas to a controller 170. The temperature information and exhaust gas information are information obtained by detecting the exhaust gas directly discharged from an engine. The exhaust gas information may include information on gas concentration, a type of exhaust gas, and so on.

The connection pipe 102 is also installed with a second temperature sensor 160-2 and a second gas sensor 140-2. The second temperature sensor 160-2 and the second gas sensor 140-2 transmit temperature information and exhaust gas information after filtering exhaust gas with the selective catalytic reduction on diesel particulate filter (SDPF) to the controller 170.

The rear unit 120 may include an inner pipe 123-1 in which a second catalytic filter 122 is installed, a bypass channel 123-2 formed to surround the second catalytic filter 122, a second injector 150-2 for injection urea, a second mixer 121 for mixing the primary filtered exhaust gas introduced through the connecting pipe 102 with the urea injected by the second injector 150-2, and so on. The second catalytic filter 122 is a selective catalytic reduction (SCR) filter.

The bypass channel 123-2 is of a sealed space and allows the primary filtered exhaust gas introduced through the connection pipe 102 to stay therein. Thus, the catalyst may be maintained above a certain temperature by heating the catalytic filter 122 using the heat of the primary filtered exhaust gas.

Accordingly, a switching valve 181 is installed at the inlet of the bypass channel 123-2 to open or close it. In other words, when the switching valve 181 is opened, the primary filtered exhaust gas is introduced into the empty space of the bypass channel 123-2. That is, the primary filtered exhaust gas is simultaneously introduced into both the bypass channel 123-2 and the second catalytic filter 122.

On the contrary, when the switching valve 181 is closed, the introduction of the primary filtered exhaust gas into the empty space of the bypass channel 123-2 is blocked. Thus, the primary filtered exhaust gas is introduced only into the second catalytic filter 122. The switching valve 181 is installed at a position spaced apart from the inlet of the rear unit 120 connected to the connection pipe 102 by a certain distance. The switching valve 181 may be disposed in parallel with the second mixer 121.

The switching valve 181 may be a butterfly valve, a cock plug valve, a ball valve, a swing check valve, a lift check valve, or the like.

An actuator 180 actuates the switching valve 181 according to the control of the controller 170. The actuator 180 may include a motor (not shown), a gear (not shown) connected to the rotary shaft (not shown) of the motor, and so on.

The rear unit 120 communicates with a discharge pipe 103 at the right thereof, and an exhaust gas secondarily filtered by the first catalytic filter 122 is discharged through the discharge pipe 103.

The discharge pipe 103 is a hollow pipe and may be formed integrally with the rear unit 120.

The discharge pipe 103 is installed with a third gas sensor 140-3. The third gas sensor 140-3 transmits gas information generated by detecting the secondary filtered exhaust gas to the controller 170.

The controller 170 controls the switching valve 181 to be opened or closed based on temperature information, exhaust flow information, vehicle operation information, or the like.

The first to third gas sensors 140-1 to 140-3 may be an electrochemical sensor for detecting a type of gas using a change in electromotive force between electrodes by reaction with gas, a semiconductor sensor for detecting a type of gas using a change in resistance of metal oxides by reaction with gas, or the like. A gas flow sensor may also be used to detect an exhaust flow rate. Of course, the first to third gas sensors 140-1 to 140-3 may include a sensor for detecting a type of gas and a sensor for detecting an exhaust flow rate.

Figure 2:
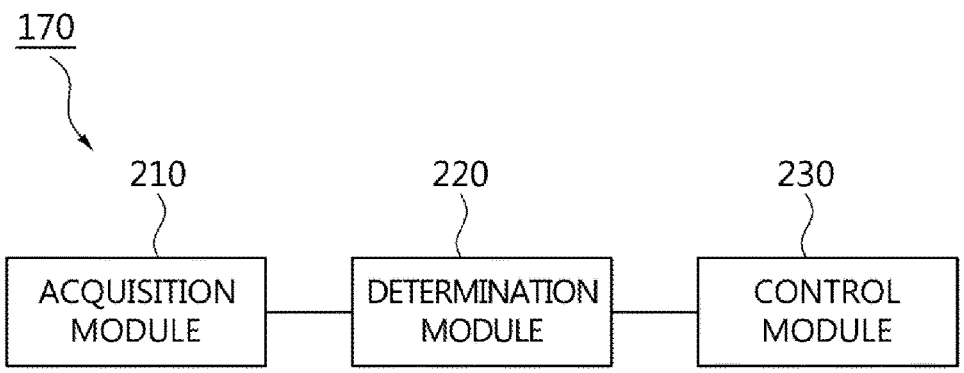
FIG. 2 is a detailed block diagram of the controller illustrated in FIG. 1.

FIG. 2 is a detailed block diagram of the controller 170 illustrated in FIG. 1. Referring to FIG. 2, the controller 170 may include an acquisition module 210 that acquires temperature information, exhaust gas information, vehicle operation information, and the like, a determination module 220 that compares the acquired temperature information, exhaust flow information, vehicle operation information, and the like with predetermined conditions to determine whether to perform bypass control for opening or closing the bypass channel 123-2, a control module 230 that performs the bypass control according to a result of the determination, and so on.

The term "module" described in FIG. 2 means a unit for processing at least one function or operation, which may be implemented by a combination of hardware and/or software. For hardware implementation, the processing unit may be implemented with application specific integrated circuits (ASICs), digital signal processors (DSPs), programmable logic devices (PLDs), field programmable gate arrays (FPGAs), processors, controllers, microprocessors, other electronic units, or a combination thereof, which are designed to perform the functions described above. For software implementation, the processing unit may be implemented with modules that perform the functions described above. The software may be stored in memory units and executed by processors. The memory units or the processors may adopt various means well known to those skilled in the art.

Figure 3:
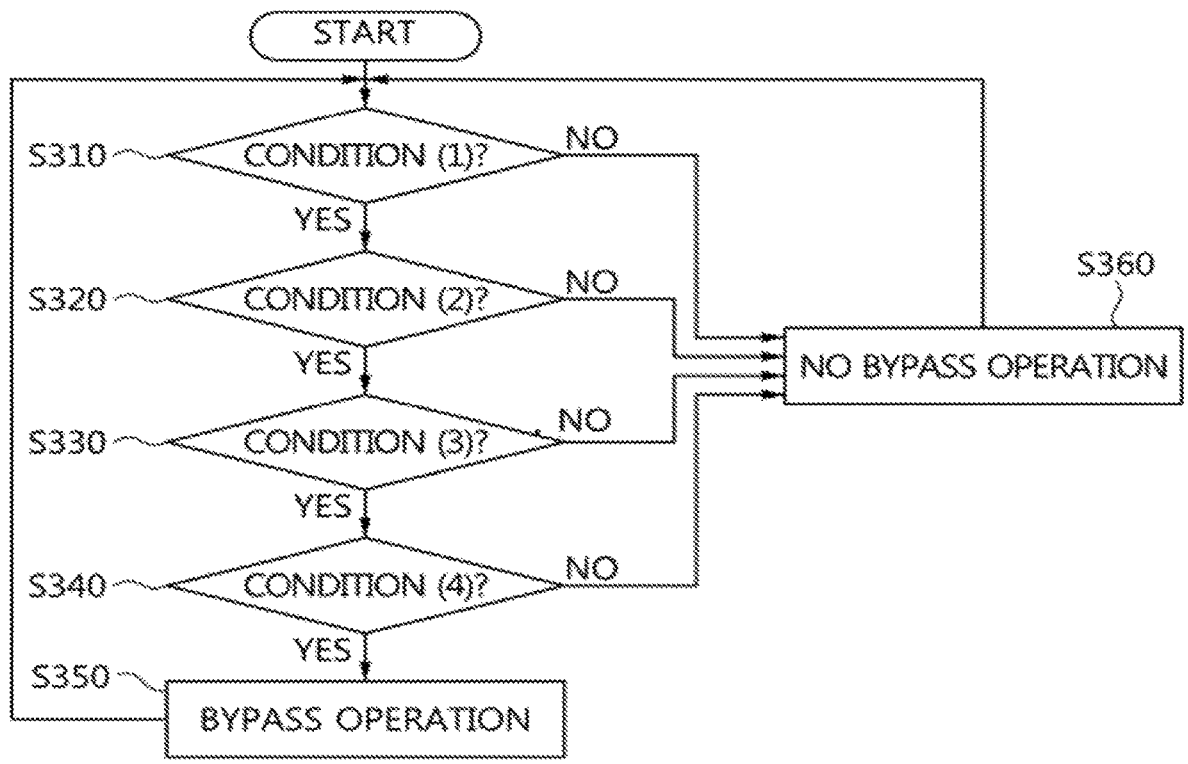
FIG. 3 is a flowchart illustrating a bypass control process according to another form of the present disclosure.

FIG. 3 is a flowchart illustrating a bypass control process according to another form of the present disclosure. Referring to FIG. 3, in the general operating environment, the SDPF alone can meet the emission regulations. Therefore, the bypass control is not used since the purification performance begins when the temperature of the exhaust gas reaches above a certain temperature at the time of initial start-up of the vehicle.

This is expressed by Condition 1, and the controller 170 (see FIG. 1) determines whether Condition 1 that is set in advance is satisfied (step S310). Condition 1 is a condition for purification rate activation of the SCR. For example, Condition 1 is whether the exhaust gas temperature (Temp 1) is greater than a first predetermined temperature (e.g., 220° C.). This is an exhaust gas temperature in the connection pipe 102 (see FIG. 1). Of course, it is possible to use an exhaust gas temperature in the engine exhaust pipe 101.

When it is determined that Condition 1 is satisfied in S310, the controller 170 determines whether Condition 2 that is set in advance is satisfied (step S320). Determining whether Condition 2 is satisfied is to determine whether the discharge amount of gas, which is a mass per unit distance of gas (e.g., NOx, $CO_2$, etc.), is larger than a predetermined first reference value (Threshold 1) and to determine whether the value obtained by multiplying the discharge amount of gas by an expected purification rate is larger than a predetermined regulated value.

In other words, the mass of gas is calculated by calculating a gas concentration obtained through the first gas sensor 140-1 (see FIG. 1) and a flow rate of exhaust gas discharged from the engine exhaust pipe 101 (see FIG. 1) and multiplying them. The exhaust flow rate is a mass of the exhaust gas per hour flowing at a specific position of the engine exhaust pipe 101. For example, when the gas concentration is about 500 PPM (parts per million) and the exhaust flow rate is 100 Kg/h, the discharge amount of gas is 100 kg/h*500/1,000,000=0.05 kg/h=50 g/h. When the current vehicle speed is about 100 km/h, the discharge amount of gas is (50 g/h)/(100 km/h)=0.5 g/km.

Since the discharge amount of gas may not exceed 0.5 g/km on average even though it instantaneously exceeds 0.5 g/km, it is possible to calculate and compare moving average values while accumulating the distance to some extent.

When the first reference value is 0.4 g/m, the current discharge amount of gas is larger than the first reference value.

The expected purification efficiency of the SDPF may be considered. This represents expected purification efficiency when the SDPF is used. The expected purification efficiency is calculated by the following Equation 1.

EXPECTED PURIFICATION EFFICIENCY=BASE MAP*CORRECTION MAP1*CORRECTION MAP2*AGING FACTOR [Equation 1]

The base map is a look-up table according to the temperature of the SCR and the occlusion amount of $NH_3$. This can be easily expressed as follows.

TABLE 1

| Temperature (□) | Occlusion Amount (g) | | | | |
|---|---|---|---|---|---|
| | 0.05 | 0.1 | 0.2 | 0.4 | ... |
| 100 | 0 | 0 | 0 | 0 | ... |
| 140 | 0.02 | 0.03 | 0.05 | 0.1 | |
| 175 | 0.1 | 0.2 | 0.28 | 0.4 | |
| ... | ... | ... | ... | ... | ... |

As indicated in the above Table 1, the higher the temperature and the occlusion amount, the higher the expected purification efficiency.

The correction map 1 is a look-up table according to the temperature of the SCR and the exhaust flow rate. In the correction map 1 relating to the exhaust flow rate, the higher the temperature and the lower the exhaust flow rate (the space velocity in the catalyst being lower), the higher the purification efficiency.

The correction map 2 is a look-up table according to the concentration of exhaust gas (NOx) and the temperature of the SCR. The correction map 1 and the correction map 2 are also configured similarly to the above Table 1.

The aging factor is to mimic that the efficiency is partially reduced according to the degree of deterioration of the catalyst (for example, traveling distance of 0 km: fresh→160,000 km: fully aged). Of course, the above correction maps and the aging factor are values that are set in advance based on the experimental results already performed.

Continuously referring to FIG. 3, a discharge mount of gas with expected purification efficiency applied is calculated by multiplying the above-mentioned discharge mount of gas by the expected purification efficiency. For example, when the discharge mount of gas is 0.5 g/km and the expected purification efficiency is 0.5, the discharge mount of gas with expected purification efficiency applied is 0.5× 0.5 g/km=0.25 g/km.

This is compared with a predetermined regulated value (e.g., 0.12 g/km). That is, this is to determine whether the value obtained by multiplying the amount of gas measured at the front end of the SDPF of the front unit 110 by the first sensor 140-1 (see FIG. 1) by the expected purification efficiency is less than or equal to the regulated value without the SCR of the rear unit 120.

When it is determined that Condition 2 is satisfied in S320, the controller 170 determines whether the discharge amount of gas, which is a mass per unit distance of gas, satisfies Condition 3 that is set in advance (step S330). Condition 3 is to check whether the discharge amount of gas is less than or equal to a predetermined reference value (Threshold 2). In other words, the mass of gas is calculated by calculating a gas concentration (i.e., a gas concentration at the rear end of the SCR) obtained through the third gas sensor 140-3 (see FIG. 1) and a flow rate of exhaust gas discharged from the discharge pipe 103 (see FIG. 1) and multiplying them. That is, the discharge amount of gas is obtained by multiplying the mass of gas and the vehicle speed. It is determined whether the discharge amount of gas is less than the reference value (Threshold 2). The reference value (Threshold 2) is a level of tail gas (tail NOx) intended by the vehicle manufacturer and may generally be less than or equal to 70% of the regulated value (about 0.12 g/km).

It is determined whether the discharge amount of gas is less than the reference value (Threshold 2) and whether the discharge mount of gas with expected purification efficiency applied calculated by the application of the expected purification efficiency is less than the regulated value.

When it is determined that Condition 3 is satisfied in step S330, the controller 170 determines whether the discharge amount of gas, which is a mass per unit distance of gas, satisfies Condition 4 that is set in advance (step S340). Condition 4 is to check whether the discharge amount of gas is less than or equal to a predetermined reference value (Threshold 3). In other words, the mass of gas is calculated by calculating a gas concentration (i.e., a gas concentration at the rear end of the SCR) obtained through the second gas sensor 140-2 (see FIG. 1) and a flow rate of exhaust gas introduced into the connection pipe 102 (see FIG. 1) and multiplying them. That is, the discharge amount of gas is obtained by multiplying the mass of gas and the vehicle speed. It is determined whether the discharge amount of gas is larger than the reference value (Threshold 3). The reference value (Threshold 3) is a level of tail gas (tail NOx) intended by the vehicle manufacturer and may generally be less than or equal to 70% of the regulated value (about 0.12 g/km).

It is determined whether the discharge amount of gas is larger than the reference value (Threshold 3) and whether the discharge mount of gas with expected purification efficiency applied calculated by the application of the expected purification efficiency is larger than the regulated value.

When it is determined that Condition 4 is satisfied in S340, the controller 170 performs the bypass control to open the switching valve 181 (see FIG. 1) (step S350). That is, when the actual amount of NOx at the rear end of the SDPF is above the regulated value so that the assistance of the SCR filter 122 is additionally desired, the bypass control is performed to maintain the SCR at a constant temperature using the heat of the exhaust gas.

On the other hand, when it is determined that the conditions are not satisfied in S310 to S340, the controller 170 does not perform the bypass control, in which case the switching valve 181 is maintained in a closed state (step S360).

In accordance with exemplary forms of the present disclosure, it is possible to improve fuel efficiency while meeting emission regulations by eliminating the back pressure loss in the mixer+catalyst through bypassing if the role of the selective catalytic reduction (SCR) is not necessary in most of normal driving conditions.

In addition, since the bypass passage is formed to surround the catalyst to maintain the temperature of the catalyst during bypassing, it is possible to obtain desired purification efficiency by immediately shutting off the bypass passage when the role of the SCR is desired.

The steps of the method or algorithm described in connection with the forms disclosed herein may be implemented in the form of program commands executable by various computer means, such as microprocessors, processors, or central processing units (CPUs), and recorded in a computer readable medium. The computer readable medium may include a program (command) cord, a data file, a data structure, or the like alone or in combination.

The program (command) cord recorded on the medium may be specially designed and configured for the present disclosure, or may be known to those skilled in the computer software for use. Examples of the computer readable medium may include magnetic media such as hard disks, floppy disks, or magnetic tapes, optical media such as CD-ROMs, DVDs, Blu-ray, and semiconductor memory devices, such as ROMs, RAMs, or flash memories, which are specifically configured to store and perform a program (command) cord.

Here, examples of the program (command) cord include a machine language code prepared by a compiler and a high-class language code executable by a computer using an interpreter, or the like. The hardware devices described above may be configured to operate as one or more software modules to perform the operation of the present disclosure, and vice versa.

While the present disclosure has been described with respect to the specific forms, it will be apparent to those skilled in the art that various changes and modifications may be made without departing from the spirit and scope of the present disclosure.

What is claimed is:

1. An apparatus for controlling exhaust gas purification, the apparatus comprising:
 a front unit communicating with an engine exhaust pipe and having a first catalytic filter;
 a rear unit communicating with the front unit through a connection pipe and having a second catalytic filter and a bypass channel configured to surround the second catalytic filter;
 an actuator configured to open and close the bypass channel; and
 a controller configured to:
  compare temperature information obtained by at least one temperature sensor, exhaust gas information obtained by at least one gas sensor, and vehicle operation information with predetermined conditions, and
  control the actuator to open or close the bypass channel based on a result of the comparison,
 wherein one end of the bypass channel is opened or closed and other end thereof is sealed so that the second catalytic filter is heated by a primary filtered exhaust gas filtered by and discharged from the front unit, and
 wherein the at least one temperature sensor is installed in each of the connection pipe and the engine exhaust pipe, and the at least one gas sensor is installed in each of the connection pipe, the engine exhaust pipe, a discharge pipe communicating with the rear unit.

2. The apparatus of claim 1, wherein the one end of the bypass channel is at a position spaced apart from an inlet of the rear unit by a certain distance, and the inlet of the rear unit is connected to the connection pipe.

3. The apparatus of claim 1, wherein the bypass channel is opened or closed by a switching valve operated by the actuator.

4. The apparatus of claim 1, wherein the bypass channel is maintained in a closed state at a time of initial start-up.

5. The apparatus of claim 1, wherein the predetermined conditions are at least one of a first condition in which an exhaust gas temperature is compared with a predetermined first reference value based on the temperature information, a second condition in which a first discharge amount of gas is compared with a predetermined second reference value, or a third condition in which a second discharge amount of gas calculated by multiplying the first discharge amount of gas by an expected purification efficiency is compared with a predetermined third reference value, and the first discharge amount of gas is calculated by multiplying a vehicle speed and an exhaust flow rate based on the vehicle operation information.

6. The apparatus of claim 5, wherein the expected purification efficiency is calculated using a base map based on the exhaust gas temperature and an occlusion amount, a first correction map based on the exhaust gas temperature and an exhaust flow rate, a second correction map based on an exhaust gas concentration and the exhaust gas temperature, and an aging factor that exhibits efficiency based on a degree of deterioration of a catalyst.

7. The apparatus of claim 1, wherein the first catalytic filter is a selective catalytic reduction on diesel particulate filter (SDPF), and the second catalytic filter is a selective catalytic reduction (SCR) filter.

8. A method of controlling exhaust gas purification apparatus in which a front unit communicating with an engine exhaust pipe and having a first catalytic filter communicates with a rear unit through a connection pipe, the rear unit having a second catalytic filter and a bypass channel surrounding the second catalytic filter, and an actuator is installed in the rear unit to open and close the bypass channel, the method comprising:
 opening or closing one end of the bypass channel by the actuator, wherein other end of the bypass channel is sealed so that the second catalytic filter is heated by a primary filtered exhaust gas filtered by and discharged from the front unit;
 comparing, by a controller, temperature information obtained by at least one temperature sensor, exhaust gas information obtained by at least one gas sensor, and vehicle operation information with predetermined conditions; and
 controlling, by the controller, the actuator to open or close the bypass channel based on a result of the comparison,
 wherein the predetermined conditions are at least one of a first condition in which an exhaust gas temperature is compared with a predetermined first reference value based on the temperature information, a second condition in which a first discharge amount of gas is compared with a predetermined second reference value, and a third condition in which a second discharge amount of gas calculated by multiplying the first discharge amount of gas by an expected purification efficiency is compared with a predetermined third reference value, and the first discharge amount of gas is calculated by multiplying a vehicle speed and an exhaust flow rate based on the vehicle operation information, and
 wherein the expected purification efficiency is calculated using a base map based on the exhaust gas temperature and an occlusion amount, a first correction map based on the exhaust gas temperature and an exhaust flow rate, a second correction map based on an exhaust gas concentration and the exhaust gas temperature, and an aging factor that exhibits efficiency based on a degree of deterioration of a catalyst.

9. The method of claim 8, wherein the one end of the bypass channel is at a position spaced apart from an inlet of the rear unit by a certain distance, and the inlet of the rear unit is connected to the connection pipe.

10. The method of claim 8, wherein the bypass channel is opened or closed by a switching valve operated by the actuator.

11. The method of claim 8, wherein the bypass channel is maintained in a closed state at a time of initial start-up.

12. The method of claim 8, wherein the at least one temperature sensor is installed in each of the connection pipe and the engine exhaust pipe, and the at least one gas sensor is installed in each of the connection pipe, the engine exhaust pipe, a discharge pipe communicating with the rear unit.

13. The method of claim 8, wherein the first catalytic filter is a selective catalytic reduction on diesel particulate filter (SDPF), and the second catalytic filter is a selective catalytic reduction (SCR) filter.

* * * * *